United States Patent [19]
Sawdon

[11] Patent Number: 5,846,913
[45] Date of Patent: Dec. 8, 1998

[54] INVERT BIODEGRADABLE N-ALKANE(S) WELLBORE FLUID CONTAINING LESS THAN 10 PERCENT BY WEIGHT OF CYCLOPARAFFING ISOPARAFFING AND AROMATIC COMPOUNDS, AND METHOD OF DRILLING WITH SUCH FLUID

[75] Inventor: Christopher Alan Sawdon, Cornwall, United Kingdom

[73] Assignee: Dowell, a division of Schlumberger Technology Corporation, Sugar Land, Tex.

[21] Appl. No.: 818,262

[22] Filed: Mar. 17, 1997

Related U.S. Application Data

[63] Continuation of Ser. No. 430,722, Apr. 28, 1995, abandoned.

[30] Foreign Application Priority Data

| Sep. 1, 1993 | [GB] | United Kingdom | 9318099 |
| Jun. 29, 1994 | [GB] | United Kingdom | 9413074 |
| Aug. 30, 1994 | [WO] | WIPO | PCT/GB94/01877 |

[51] Int. Cl.⁶ .............. C09K 7/02; C09K 7/06; B21B 21/00
[52] U.S. Cl. .......... 507/103; 507/905; 507/910; 252/8.5 P; 252/8.55 R; 252/3.5 P; 175/65; 175/66; 175/69; 175/70
[58] Field of Search ................ 507/103, 905, 507/910; 252/3.5 P, 8.5 M, 8.55 R; 175/65, 66, 69, 70

[56] References Cited

U.S. PATENT DOCUMENTS

| H1000 | 12/1991 | Patel et al. | 507/103 |
| 4,012,329 | 3/1977 | Hayes et al. | 252/8.5 P |
| 4,508,628 | 4/1985 | Walker et al | 252/8.5 P |
| 5,096,883 | 3/1992 | Mercer et al. | 507/103 |
| 5,189,012 | 2/1993 | Patel et al. | 507/103 |
| 5,333,698 | 8/1994 | Van Slyke | 175/65 |
| 5,432,152 | 7/1995 | Dawson et al. | 507/103 |

FOREIGN PATENT DOCUMENTS

| 0 134 173 | 8/1984 | European Pat. Off. . |
| 0 134 173A1 | 8/1984 | European Pat. Off. . |
| 0 627 481 A1 | 5/1994 | European Pat. Off. . |
| 2 212 192A | 11/1988 | United Kingdom . |
| 2212192 | 7/1989 | United Kingdom . |
| WO 83/02949 | 2/1983 | WIPO . |
| WO83/02949 | 9/1983 | WIPO . |
| WO 95/09215 | 7/1994 | WIPO . |

*Primary Examiner*—Floyd D. Higel
*Attorney, Agent, or Firm*—John E. Vick, Jr.; Douglas Y'Barbo

[57] ABSTRACT

The invention concerns wellbore fluids suitable for use in the oil and gas exploration and production industries and embraces fluids used for drilling, completion, workover or packing of wellbores. The invention is especially concerned with biodegradable wellbore fluids the liquid phase of which consists of an oil, or of water-in-oil "invert" emulsions, where the oil phase comprises n-alkanes.

22 Claims, No Drawings

INVERT BIODEGRADABLE N-ALKANE(S) WELLBORE FLUID CONTAINING LESS THAN 10 PERCENT BY WEIGHT OF CYCLOPARAFFING ISOPARAFFING AND AROMATIC COMPOUNDS, AND METHOD OF DRILLING WITH SUCH FLUID

This application is a continuation of application Ser. No. 08/430,722, filed on Apr. 28, 1995, and now abandoned.

This invention concerns wellbore fluids suitable for use in the oil and gas exploration and production industries and embraces fluids used for drilling, completion, workover or packing of wellbores. The invention is especially concerned with biodegradable wellbore fluids the liquid phase of which consists of an oil, or of water-in-oil "invert" emulsions, where the oil phase comprises n-alkanes having from 10 to 20 carbon atoms.

A wellbore is drilled by attaching to the bottom of a length of drill pipe a cutting bit which is rotated either by means of a prime mover on the surface which applies rotary motion to the top end of the drill pipe or by means of a turbine motor fixed to the drill pipe near the lower end, the turbine motor being driven by circulating fluid in the wellbore.

In either case a drilling fluid is required to remove cuttings from around the bit and to transport the cuttings to the surface for separation and removal. The drilling fluid also cools the bit and lubricates both bit and drill pipe thus reducing friction.

In many cases it is possible to use as the drilling fluid a simple mixture comprising water and a smectite clay which increases the viscosity of the fluid for the purposes of suspending and transporting the cuttings. However it is often necessary to drill a wellbore through geological formations the constituent materials of which swell and disintegrate on contact with water. In such cases an oil-based drilling fluid is used, that is a fluid in which the liquid phase consists of oil, or of water-in-oil "invert" emulsions.

Such oil based drilling fluids avoid the hydration problems caused by water contacting shale or salt formations. They also possess advantages compared to water based fluids of enhanced lubrication of the drill pipe, inhibition of corrosion of the drill pipe, and high stability at high temperatures.

Originally such oil based drilling fluids utilised diesel fuel or other similar petroleum fractions as the oil phase. However these contain relatively high proportions of aromatic hydrocarbons and other compounds which are toxic to marine life.

More recently, highly refined low aromatic mineral oils have been used as the oil phase of drilling fluids. These are of much lower toxicity than diesel fuel and are produced from petroleum feedstocks by a variety of processes which reduce the concentration of aromatics and especially polynuclear aromatics.

These oils usually contain less than about 6% aromatics, and substantial proportions of paraffins such as branched iso-paraffins, cycloparaffins (naphthenics), as well as n-alkanes (straight chain paraffins). The ratio of the components is a function of the petroleum feedstock used (crude oil source) and also the refining process used.

According to a first aspect of the present invention, there is provided a biodegradable wellbore fluid having a continuous oil phase which comprises at least 50% by weight of an n-alkane having from 10 to 20 carbon atoms, or a mixture of such alkanes.

The wellbore fluid is preferably substantially free of cycloparaffins, iso-paraffins and aromatic compounds. Thus, the continuous oil phase of the wellbore fluid of the present invention preferably has less-than 10%, more preferably less than 5%, by weight of cycloparaffins, iso-paraffins, aromatic compounds and polyalphaolefins.

Whilst polyalphaolefins are poorly degradable under anaerobic conditions, they are biodegradable under some conditions and may therefore be tolerated in the wellbore fluid of the present invention, for example in amounts up to about 50% by volume of the oil phase. In preferred embodiments of the invention, any polyalphaolefin is present in an amount no greater than 20% by volume, more preferably no greater than 10% by volume, and most preferably no greater than 5% by volume.

The continuous oil phase of the wellbore fluid of the present invention may contain up to 50% by weight of another biodegradable oil such as an ester oil as described in, for instance, EP-A-0374671 or EP-A-0374672 or a vegetable oil.

The drilling fluid of the invention has high biodegradability, both under aerobic and anaerobic conditions, and low toxicity.

The n-alkanes may be manufactured by the processing of renewable feedstocks obtained from vegetable oils or animal fats. For example, blends of n-alkanes, substantially free of other hydrocarbon types, and of suitable carbon chain length, may be produced directly from triglyceride oils and fats such as coconut oil or palm kernel oil. The vegetable oil can be reduced by hydrogen at high temperature and pressure (approximately 360° C. and at 40 to 100 bar), in the presence of a catalyst, to yield substantially pure n-alkanes of carbon number corresponding to the fatty acids combined in the triglyceride ester feedstock. Propane is a by-product from the reduction of the glycerol component. The propane is readily separable from the n-alkanes because of its volatility. Small quantities of n-octane which may result can be undesirable with respect to the flash point of the product and may readily be removed by distillation if required, leaving a more preferable mixture of n-alkanes of $C_{10}$–$C_{18}$ chain length.

Similarly, natural fatty acids may be decarboxylated or reduced to produce suitable n-alkanes of high purity. Fatty alcohols and alphaolefins may also be reduced to n-alkanes.

In a preferred embodiment of the present invention, the n-alkanes of the present invention have from 12 to 18 carbon atoms.

Surprisingly it has been found that the n-alkane mixtures of the present invention are highly advantageous for use as the continuous liquid phase of biodegradable oil based or invert emulsion wellbore fluids. (Invert emulsion wellbore fluids normally have a dispersed brine phase emulsified into the oil.)

The wellbore fluids of the present invention may contain added pour-point depressants to reduce the pour point (freezing point) of the n-alkane mixture when it is desired to utilise the drilling fluid in a cold environment.

The oil-continuous wellbore fluids may be used at oil water ratios preferably in the range 25:75 and 100:0.

The liquid components of the wellbore fluid according to the invention may comprise an emulsion of a dispersed hydrophilic liquid in the continuous oil phase.

In order to accelerate biodegradation, the wellbore fluid according to the present invention may further include added nutrients. Suitable nutrients include sources of the elements nitrogen, phosphorus and potassium, and preferably also trace elements such as iron required by bacteria. The nutrient may, for example, be dissolved in the aqueous phase if the wellbore fluid is an invert mud, or dispersed in the oil phase.

The wellbore fluid may also include an electron acceptor, for example, hematite, nitrate salts, and sulphate salts.

The principle of adding nutrients and/or an electron acceptor to a wellbore fluid may be extended to any wellbore fluid having a water-immiscible, or oily phase. Thus, in accordance with a further aspect of the present invention, there is provided a wellbore fluid comprising an oily phase characterised in that the wellbore fluid further comprises sources of one or more of the elements nitrogen, phosphorus and potassium, added as nutrients for the purpose of enhancing biodegradation of the said oil phase of the wellbore fluid. Preferably, the wellbore fluid comprises sources of each of the three elements.

In this aspect of the invention, the oil of the oil phase should be one which is capable of biodegrading in the presence of said nutrients under anaerobic conditions.

In the wellbore fluid of this further aspect of the invention, the wellbore fluid may additionally comprise sources of trace elements required by anaerobic bacteria for effective biodegradation and may additionally comprise an electron acceptor to aid in biodegradation.

Optional additives which may be contained in the wellbore fluid include: emulsifiers and other surface active agents, viscosifiers such as organoclays and polymers, filtration control agents such as Gilsonite(™) and organically modified lignite, density increasing agents such as powdered barytes or hematite or calcium carbonate, or other wellbore fluid additives known to those skilled in the art.

Other oil miscible and biodegradable liquids such as oil soluble esters, vegetable oils, may be included as a minor proportion (e.g. less than 50% by weight) of the continuous oil phase of the wellbore fluid.

The emulsified water phase of the wellbore fluid may contain dissolved salts such as alkali metal halides. For example, sodium chloride, alkaline earth metal halides such as calcium chloride, or other water soluble organic compounds or salts for the purpose of adjusting the water activity of the dispersed aqueous phase (to enhance drilling performance).

Prior to the present invention it was not appreciated that biodegradable wellbore fluids could be formulated using n-alkanes as the continuous liquid phase, nor was it appreciated that drilling fluids could be formulated whose continuous phase comprised substantially pure n-alkane mixtures with the advantageous properties of low plastic viscosity (as a consequence of the low kinematic viscosity of the n-alkane mixture), low enough pour point for all but the coldest environmental conditions, acceptable flash point, minimal effect on human skin and minimal carcinogenicity, complete freedom from U.V. fluorescence, and minimal swelling effect on rubber goods.

According to a second aspect of the present invention, there is provided a method of drilling a well wherein the drilling fluid is a wellbore fluid according to the first aspect of this invention. The cuttings which are contaminated with the drilling fluid may be discharged to the ocean floor or land farmed by spreading the cuttings on the land whereupon natural biodegradation processes effectively remove the oil contamination.

According to a third aspect of the present invention, there is provided the use, as the continuous oil phase of a wellbore fluid, of an n-alkane having from 10 to 20 carbon atoms.

The following examples illustrate the environmental and technical properties and performance of the wellbore fluids based on n-alkanes of the present invention.

The wellbore fluid properties were tested in accordance with API RP 13B-2 1990.

| | |
|---|---|
| KV | The kinematic viscosity of an oil in centistokes. |
| PV | The plastic viscosity of a drilling fluid (centipoise). Generally, a low PV is advantageous (as are low KV oils). |
| AV | The apparent viscosity of a drilling fluid (centipoise). |
| YP | The yield point (lbs/100 ft$^2$) of the fluid and is a measure of the non Newtonian viscous characteristics. |
| 6 rpm and 3 rpm | Dial readings on the Fann Viscometer which indicate the viscosity at low shear rates. Higher 6 rpm and 3 rpm values indicate greater thixotropy which is generally advantageous. |
| Gels | A measure of the gelling and suspending characteristics of the fluid (lbs/100 ft$^2$), determined using the Fann viscometer. |
| ES | Electrical Stability of an emulsion (volts). high numbers imply high stability. |
| HTHP FL | High Temperature and High Pressure Fluid Loss. A measure of the ease of filtering a drilling fluid through a filter paper under HTHP conditions. Results in milliliters of filtrate. Low filtrate volumes are advantageous. |

EXAMPLE 1

Some properties of n-alkanes and other conventional or more recent base oils are compared in Table 1 which appears at the end of this description. In the table, base oil "Mixture $C_{12, 14, 16, 18}$" contained the following n-alkane approximate concentrations:

| | % Weight |
|---|---|
| n-dodecane | 52 |
| n-tetradecane | 19.5 |
| n-hexadecane | 10.5 |
| n-octadecane | 18 |

The above analysis is typical of the product obtained when coconut oil or palm kernel oil feedstocks are processed to yield n-alkanes, and the minor quantities of n-octane and n-decane are removed by distillation.

From Table 1 it is clear that $C_{12}$ to $C_{18}$ n-alkane blends possess advantageously low kinematic viscosity in comparison to linear alkylbenzene (LAB) and, in particular, Finagreen BDMF ester oil.

The n-alkane blend also compares favourably to LAB in terms of lower swelling effects on rubber goods and in the absence of fluorescence under ultra violet light. The hydrolytic stability of n-alkane blends is excellent, in contrast to ester oils which hydrolyse uncontrollably at temperatures in excess of circa 140° C.

EXAMPLE 2

The n-alkane ($C_{12, 14, 16, 18}$) mixture detailed in Example 1 was tested for its pour point by the Institute of Petroleum method IP15/67.

A similar test was performed on a sample of the n-alkane mixture which was dosed with 0.49% by weight of a commercial pour point depressant—EMPICRYL PPT 148*.
*Trademark of Albright and Wilson Limited.

| | Pour Point °C. |
|---|---|
| (1) $C_{12,14,16,18}$ n-alkane mixture. | −2° C. |
| (2) As (1) + 0.49% EMPICRYL PPT 148. | −9° C. |

The results show that the pour point of n-alkane mixtures may readily be reduced by the addition of a pour point depressant to allow effective use of the fluid under cold environmental conditions.

TABLE 1

| Oil Type | KV cSt 22° C. | KV Cst 40° C. | Flash Point °C. | Pour Point °C. | Rubber Compatibility | U.V. Fluorescence | Hydrolytic Stability at above 140° C. |
|---|---|---|---|---|---|---|---|
| n-DECANE | 1.0 | — | 46 | −29.7 | Good | None | Good |
| n-DODECANE | 1.5 | — | 74 | −9.6 | Good | None | Good |
| n-TETRADECANE | 2.8 | — | 99 | 5.9 | Good | None | Good |
| n-HEXADECANE | 4.6 | — | 135 | 18 | Good | None | Good |
| n-OCTADECANE | — | 3.6 | | 28 | Good | None | Good |
| MIXTURE $C_{12, 14, 16, 18}$ n-alkanes | — | 2.0 | 91 | −2 | Good | None | Good |
| FINAGREEN BDMF* (ESTER OIL) | | 5.9 | >150 | −23 | Good | Moderate | Poor |
| LINEAR ALKYL BENZENE ($C_{10}$–$C_{12}$) | | 4.0 | | <−70 | Moderate–Poor | Moderate | Good |
| POLYALPHAOLEFIN (M.I. DRILLING FLUIDS) | | 3.9–9.6 | 156–172 | <−65 | Good | None | Good |
| CLAIRSOL 350 MHF* | | 1.95 | 93 | −20 | Good | Moderate | Good |
| MENTOR 28* | | 4.2 | 120 | −15 | Fair | Moderate | Good |

*Tradename

EXAMPLE 3

The n-alkane mixture of $C_{12}$ to $C_{18}$ paraffins described in Example 1 (hereinafter "NAM 1218"), was used as the continous phase of a wellbore fluid of the following formulation.

Formulation per 350 mls of wellbore fluid

| NAM 1218 | 125 g |
|---|---|
| INTERDRILL EMUL HT* | 14 g |
| INTERDRILL OW* | 1.5 g |
| TRUFLO 100* | 2.5 g |
| TRUDRILL S* | 2.5 g |
| TRUVIS HT* | 3.5 g |
| Lime | 10 g |
| OCMA ball clay | 10 g |
| Calcium Chloride (86.5%) | 18 g |
| Water | 43 g |
| Barite | 460 g |

The properties of this wellbore fluid were compared to those of a similar formulation substituting a polyalphaolefin (essentially di-decene) for the NAM 1218.

Both fluids have a density of about 1.96 (16.3 lb/gal) and an oil:water ratio of 80:20.

The properties were tested both before (BHR) and after (AHR) heat ageing for 16 hours at 184° C. The viscous properties were measured at 50° C., and the HTHP FL at 178° C. and 500 psi. The results obtained are illustrated in Table 2 below

* Mark of Schlumberger Dowell Limited

TABLE 2

| | Oil Phase | | | |
|---|---|---|---|---|
| | NAM 1218 | | Polyalphaolefin (PAO) | |
| Property | BHR | AHR | BHR | AHR |
| AV | 51 | 54 | 105 | 125 |
| PV | 38 | 45 | 83 | 111 |
| YP | 26 | 18 | 44 | 28 |
| 6 rpm/3 rpm | 13/11 | 9/8 | 20/18 | 11/9 |
| Gels | 13/20 | 11/18 | 20/32 | 11/20 |

TABLE 2-continued

| | Oil Phase | | | |
|---|---|---|---|---|
| | NAM 1218 | | Polyalphaolefin (PAO) | |
| Property | BHR | AHR | BHR | AHR |
| ES | 1055 | 980 | 1104 | 916 |
| HTHP FL | — | 17.6 | — | 16.4 |

The Apparent and Plastic viscosity (AV & PV) of the PAO fluid are more than double that of the NAM 1218 fluid as a consequence of the higher kinematic viscosity of the PAO. Low plastic viscosity is a definite advantage in minimising pressure drops on pumping and in minimising the "equivalent circulating density" (or the pressure exerted on possibly fragile downhole rock formations).

From the results after heat ageing (AHR), the NAM 1218 fluid provides good 6 rpm/3 rpm values and gel strengths (low shear rate viscosity and suspending ability), without paying the penalty of high plastic viscosity. The relatively small change in properties after heat ageing the NAM 1218 fluid shows the stability of the fluid at very high temperatures.

In contrast, emulsion fluids formulation using an ester oil continuous phase will undergo irreversible breakdown and thickening caused by hydrolysis of the ester, when exposed to such high temperature.

EXAMPLE 4

The n-alkane mixture of $C_{12}$ to $C_{18}$ paraffins described in Example 1 ("NAM 1218"), was used as the continuous phase of a wellbore fluid of the following formulation:

Formulations per 350 mls of wellbore fluid

| | |
|---|---|
| NAM 1218 | 167.4 g |
| Emulsifier | 11.5 g |
| Organoclay Viscosifier | 4 g |
| Filtration reducer | 6 g |
| Lime | 5 g |
| Water | 57.8 g |
| $CaCl_2$ (86.5% purity) | 19.7 g |
| OCMA ball clay | 25.0 g |
| Barite | 121.7 g |

The fluid exhibits a density of 1.2 (10 lb/gal) and an oil:water ratio of 80:20.

A fluid of similar formulation was also mixed using linear alkyl benzene(LAB) as the continuous phase.

Both fluids were tested for biodegradability under aerobic conditions by the method OECD 301F. The results obtained are illustrated in Table 3 below.

TABLE 3

| Fluid Type | Biodegradability % |
|---|---|
| NAM 1218 | 100% |
| LAB | 66% |

The NAM 1218 based wellbore fluid is of exceptionally good biodegradability under aerobic conditions.

EXAMPLE 5

The NAM 1218 wellbore fluid formulation as in Example 4 was compared for anaerobic biodegradability against similar formulations based upon mineral oil, linear alkyl benzene and 2-ethylhexyl oleate. The anaerobic biodegradation test method was ECETOC 28 (56 day test).

A second NAM 1218 formulation included Ammonium Sulphate (3.1 g) and potassium dihydrogen phosphate (2.4 g) mixed into the brine phase to ascertain whether such nutrient addition would accelerate the biodegradation process. The results obtained are illustrated in Table 4 below.

TABLE 4

| Base Fluid Type | Anaerobic Biodegradability % |
|---|---|
| Mineral Oil | 0 |
| Linear alkyl benzene | 0 |
| NAM 1218 | 10.2 |
| NAM 1218 + nutrients | 24.9 |
| 2-ethylhexyl oleate | 48.3 |

Anaerobic biodegradation of predominantly hydrocarbon materials to carbon dioxide and methane much less energetically favourable than biodegradation under aerobic conditions to carbon dioxide. Hence lower results, and slower rates, are normal.

As expected the mineral oil, which contains much branched and cyclic hydrocarbons, did not biodegrade. Neither did the linear alkyl benzene based drilling fluid.

However the NAM 1218 fluid displayed significant anaerobic biodegradation at 10.2%, which is catalysed to 24.9% by the addition of nutrient salts providing the elements N, P and K and an electron acceptor as sulphate. These are surprisingly good results.

For comparison, the ester fluid (2-ethylhexyl oleate) is more biodegraded at 48.3%, but such fluids cannot be used for hot well conditions above about 140° C. because of hydrolysis of the ester.

EXAMPLE 6

The NAM 1218 wellbore fluid formulation as in Example 4 was tested for toxicity to Corophium volutator, a seabed sediment dweller. Similar formulations using alternative oil phases were compared as shown in Table 5.

TABLE 5

| Fluid Type | Toxicity to Corophium $LC_{50}$ (mg/kg sediment) |
|---|---|
| Mineral Oil | 294 |
| Linear Alkyl Benzene | 210 |
| NAM 1218 | 1654 |

The results show the very advantageous increase in LC50 (reduction in toxicity) provided by the NAM 1218 wellbore fluid.

I claim:

1. A biodegradable wellbore fluid comprising a continuous oil phase containing a dispersed hydrophilic liquid, the continuous oil phase comprising at least 50 percent by weight of an n-alkane having from 10 to 20 carbon atoms, or mixture of n-alkanes having from 10 to 20 carbon atoms, the continuous oil phase containing less than 10 percent by weight of cycloparaffins, isoparaffins, and aromatic compounds, and not greater than 20 percent by volume of polyalphaolefin.

2. The wellbore fluid of claim 1 in which the continuous oil phase comprises at least 50 percent by weight of a mixture of n-alkanes having from 10 to 20 carbon atoms.

3. The wellbore fluid of claim 1 in which the continuous oil phase comprises at least 50 percent by weight of a mixture of n-alkanes having from 12 to 18 carbon atoms.

4. The wellbore fluid of claim 2 in which the mixture of n-alkanes is derived by the hydrogen reduction of natural fats, vegetable oils, naturally derived fatty acids, naturally derived fatty alcohols, or alphaolefins.

5. The wellbore fluid of claim 3 in which the mixture of n-alkanes is derived by the hydrogen reduction of natural fats, vegetable oils, naturally derived fatty acids, naturally derived fatty alcohols, and alphaolefins.

6. The wellbore fluid of claim 2 which contains a pour point depressant.

7. The wellbore fluid of claim 3 which contains a pour point depressant.

8. The wellbore fluid of claim 2 which contains one or more nutrients selected from the group consisting of nitrogen, phosphorus, and potassium.

9. The wellbore fluid of claim 3 which contains one or more nutrients selected from the group consisting of nitrogen, phosphorus, and potassium.

10. The wellbore fluid of claim 3 which contains an electron acceptor.

11. The wellbore fluid of claim 10 in which the electron acceptor is water soluble and selected from the group consisting of hematite, nitrate salts, and sulphate salts.

12. The wellbore fluid of claim 2 in which the oil phase contains no more than 35 percent by weight of branched chain alk-1-enes.

13. A method of drilling a well comprising attaching a cutting bit to a length of drill pipe; rotating the cutting bit to produce cuttings; and removing cuttings from around the cutting bit with a drilling fluid which is a biodegradable wellbore fluid comprising a continuous oil phase containing a dispersed hydrophilic liquid, the continuous oil phase comprising at least 50 percent by weight of an n-alkane having from 10 to 20 carbon atoms, or mixture of n-alkanes having from 10 to 20 carbon atoms, the continuous oil phase containing less than 10 percent by weight of cycloparaffins, isoparaffins, and aromatic compounds, and not greater than 20 percent by volume of polyalphaolefins.

14. The method of claim 13 in which the continuous oil phase comprises at least 50 percent by weight of a mixture of n-alkanes having from 12 to 18 carbon atoms.

15. A biodegradable wellbore fluid which is an emulsion of a dispersed hydrophilic liquid in a continuous oil phase comprising at least 50 percent by weight of the oil phase of an n-alkane having from 10 to 20 carbon atoms, or a mixture of such alkanes, wherein the oil phase contains less than 10 percent-by weight of cycloparaffins, isoparaffins, and aromatic compounds, and no more than 20 percent by volume of polyalphaolefin.

16. The wellbore fluid of claim 15 in which the continuous oil phase comprises at least 50 percent by weight of a mixture of n-alkanes having from 12 to 18 carbon atoms.

17. The wellbore fluid of claim 2 in which the continuous phase contains up to 50 percent by weight of a biodegradable ester oil.

18. The wellbore fluid of claim 3 in which the continuous phase contains up to 50 percent by weight of a biodegradable ester oil.

19. The wellbore fluid of claim 2 in which the continuous phase has high biodegradability under anaerobic conditions.

20. The wellbore fluid of claim 3 in which the continuous phase has high biodegradability under anaerobic conditions.

21. The method of claim 14 in which the continuous oil phase contains up to 50 percent by weight of a biodegradable ester oil.

22. The method of claim 14 in which the continuous phase has high biodegradability under anaerobic conditions.

* * * * *